US008452666B2

(12) United States Patent
Patel et al.

(10) Patent No.: US 8,452,666 B2
(45) Date of Patent: *May 28, 2013

(54) ESCROW PAYMENT TO FACILIATE ON-LINE TRANSACTIONS

(75) Inventors: Amol Patel, Los Altos, CA (US); German Scipioni, San Jose, CA (US)

(73) Assignee: Ebay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/329,060

(22) Filed: Dec. 16, 2011

(65) Prior Publication Data

US 2012/0089483 A1      Apr. 12, 2012

Related U.S. Application Data

(63) Continuation of application No. 12/268,899, filed on Nov. 11, 2008, now Pat. No. 8,112,314.

(60) Provisional application No. 61/077,039, filed on Jun. 30, 2008.

(51) Int. Cl.
*G06Q 40/00* (2006.01)

(52) U.S. Cl.
USPC .......................................... 705/26.4; 705/30

(58) Field of Classification Search
USPC ..................................... 705/10–44
See application file for complete search history.

(56) References Cited

U.S. PATENT DOCUMENTS

| 5,794,207 A | 8/1998 | Walker et al. |
| 6,260,024 B1 | 7/2001 | Shkedy |
| 6,988,658 B2 | 1/2006 | Smith |
| 7,110,987 B2 | 9/2006 | Englehart |
| 7,177,836 B1 * | 2/2007 | German et al. ................ 705/40 |
| 7,343,339 B2 | 3/2008 | Harrison, Jr. et al. |
| 7,487,113 B2 | 2/2009 | Ray |
| 7,624,057 B1 | 11/2009 | Lunquist |
| 7,711,621 B2 | 5/2010 | Huang et al. |
| 7,729,984 B1 * | 6/2010 | Nappi ............................ 705/39 |
| 7,765,148 B2 | 7/2010 | German et al. |
| 7,801,813 B2 * | 9/2010 | Brown et al. .................. 705/39 |
| 7,849,013 B2 | 12/2010 | Englehart |
| 7,937,312 B1 | 5/2011 | Woolston |
| 7,979,347 B1 | 7/2011 | Greener et al. |
| 8,005,744 B2 | 8/2011 | Hamor |
| 8,024,261 B2 * | 9/2011 | Erbey et al. .................... 705/38 |
| 8,032,446 B2 * | 10/2011 | Lites .............................. 705/37 |
| 8,112,314 B2 * | 2/2012 | Patel et al. .................. 705/26.1 |
| 8,126,808 B2 * | 2/2012 | Reid et al. ...................... 705/45 |
| 8,135,650 B2 * | 3/2012 | Walker et al. .................. 705/77 |
| 8,180,706 B2 * | 5/2012 | Bishop et al. .................. 705/39 |
| 8,290,854 B2 * | 10/2012 | Lites .............................. 705/37 |

* cited by examiner

*Primary Examiner* — Frantzy Poinvil
(74) *Attorney, Agent, or Firm* — Haynes and Boone, LLP

(57) ABSTRACT

A system and method enables sellers to define a secret shared with an on-line payment provider when listing an item or service for purchase. Consumers deposit funds into an on-line escrow or holding account before committing to a financial on-line transaction or purchase. Once an item is located, the consumer may contact the seller for additional information. By placing funds in escrow, the seller may be more willing to spend the time and effort to deal with the consumer. The consumer, in turn, receives more information to make a purchasing decision. If the transaction is to be completed, the consumer instructs the payment provider maintaining the escrow account to release the funds to the seller's account. The seller is notified by the payment provider, where the notification includes the secret. This enables the seller to authenticate the confirmation message.

21 Claims, 3 Drawing Sheets

ESCROW PAYMENT TO FACILIATE ON-LINE TRANSACTIONS

RELATED APPLICATIONS

This application is a continuation patent application of an U.S. patent application Ser. No. 12/268,899, filed Nov. 11, 2008, now U.S. Pat. No. 8,112,314, entitled "ESCROW PAYMENT TO FACILITATE ON-LINE TRANSACTIONS," which claims the benefit of an U.S. Provisional Application No. 61/077,039, filed Jun. 30, 2008, entitled "CLASSIFIED ADS/ESCROW PAYMENT," the disclosures of which are incorporated herein by reference in their entirety.

BACKGROUND

1. Field of the Invention

The present invention generally relates to financial transactions and more particularly to facilitating on-line financial transactions through an on-line payment provider.

2. Related Art

With the ever-increasing popularity of the Internet and of Internet commerce, both consumers and sellers are using the Internet to facilitate financial transactions between buyers and sellers. In on-line financial transactions, consumers may use third-party payment service providers to pay for products and services through electronic communications with online merchants over electronic networks, such as the Internet. The third-party payment providers provide an infra-structure, software, and services that enable member buyers and member sellers or merchants to make and receive payments. The payments may be credit card payments, electronic bank transfers, or other payment techniques offered by the third-party payment provider. One payment technique may be transferring money from an account held by the payment provider, as opposed to transferring credit from an outside credit card company or an outside financial institution or bank. Transferring money held in the payment provider account may be cheaper for a user because it avoids certain transaction fees or interest payments that may be incurred when transferring money or making a payment from an outside credit or banking institution.

One type of on-line transaction utilizing a third-party payment provider is classified ads, such as craigslist or Kijiji, in which sellers list goods and services for purchase through an on-line site. These listings are generally very basic, with just a brief written description of the item or service. Thus, when a potential buyer searches through the listings and finds an interesting item, the buyer may need additional information before committing to purchase the item. On the seller side, the seller may not want to spend time corresponding with the potential buyer because of various reasons, such as uncertainty in the actual interest of the buyer and financial ability of the buyer to pay for the item. As a result, the seller may be hesitant to spend additional time and effort for the potential buyer, such as providing him additional information, and the seller may be hesitant to commit to purchasing an item with only limited information. This may then lead to a potential transaction being canceled before it even starts.

Another problem with on-line purchasing is the possibility of a fraudulent message to a seller confirming a transfer of funds. For example, a seller may receive a fraudulent message on the seller's mobile device, informing him that funds have been transferred to his account. The seller, relying on this information, then releases the item to the "buyer," only later to find out that no funds were actually transferred or deposited. The seller would then have given up the item, with no funds transferred and no way to contact the "buyer."

SUMMARY

According to one embodiment, a seller posts an item or service for purchase on an on-line site. The seller includes a secret message, which only the seller and the on-line site knows. The secret message may be in any form, such as a phrase, a sequence of letter, characters, and/or numbers, a recorded voice, or a picture. A buyer locates an item for purchase from a potential seller and contacts the seller for more information about or conveys interest in the item. The buyer can then transfer all or a portion of the selling price of the item into an escrow account maintained by a payment provider, such as PayPal, Inc. The funds are held in escrow during the period of the contemplated sale. Once both the buyer and seller are satisfied and want to complete the transaction, the buyer can notify the payment provider, such as a mobile device, to release and transfer the funds to the seller's account. If the funds held in escrow are only a portion of the purchase price, the buyer may, at the same time, instruct the payment provider to transfer additional funds from the buyer's account to the seller's account. The payment provider can then notify the seller, such as to the seller's mobile device through SMS, that the funds are now present in the seller's account. This notification would include the seller's secret message. If the payment provider is not the on-line site where the seller listed the item, the on-line site may communicate the secret message to the payment provider. Upon notification, the seller provides the item to the buyer to complete the transaction.

By placing some or all of the purchase price into escrow, on-line financial transactions may be completed more efficiently and with greater confidence. The seller would know the buyer is serious and has sufficient funds to make the purchase, thereby more willing to hold the item or service until the transaction is completed or canceled. The buyer may be able to obtain more information or have the seller put forth more effort in the transaction due to the seller's belief that the buyer is serious about the potential purchase. Furthermore, the seller is assured that funds have been transferred into his account due to the confirmation of the secret message when notification is sent. This prevents fraudulent confirmation messages being sent and the seller unwittingly releasing the unpaid item.

These and other features and advantages of the present invention will be more readily apparent from the detailed description of the embodiments set forth below taken in conjunction with the accompanying drawings.

Figure 1:
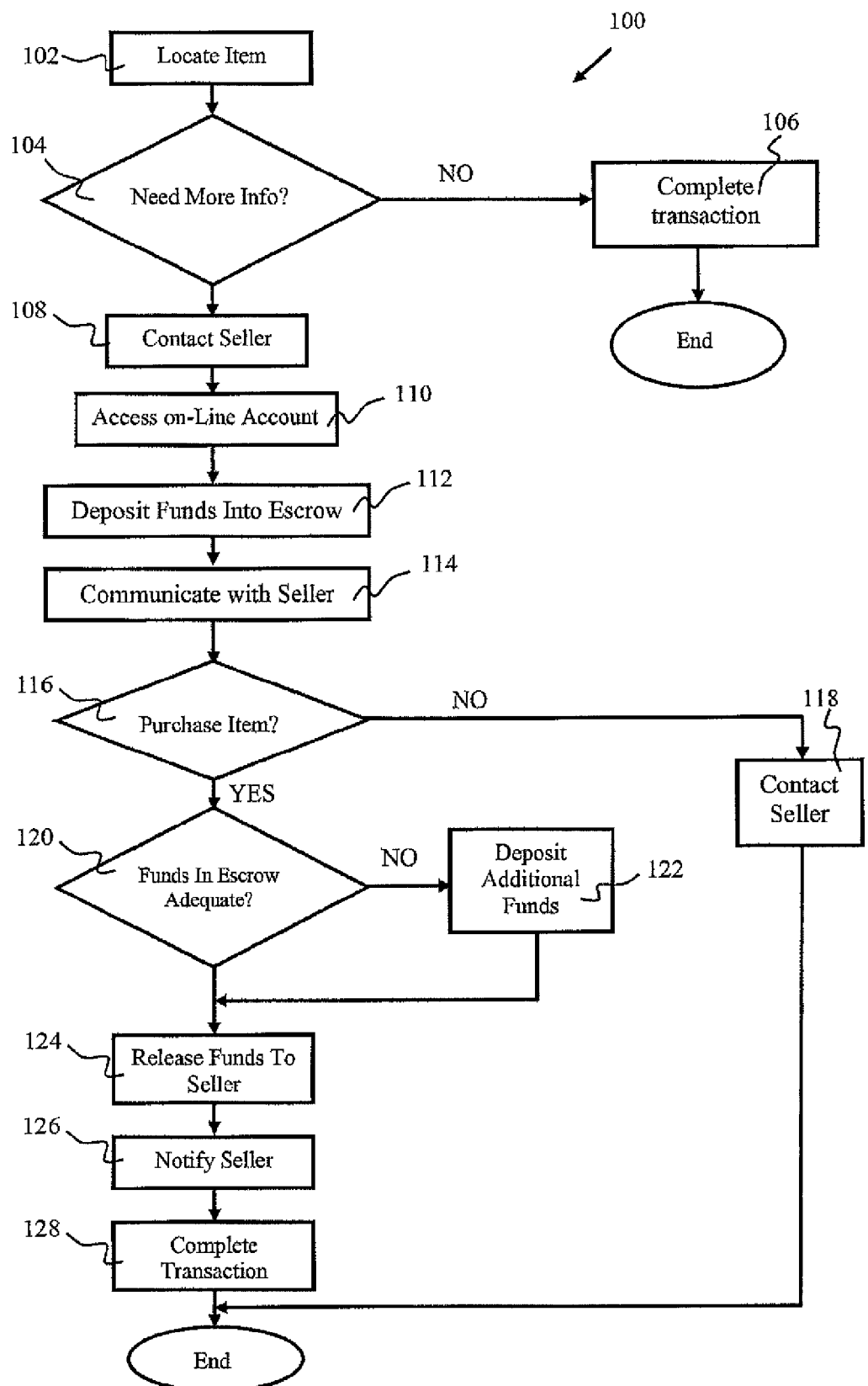
FIG. 1 is a flowchart showing steps used to facilitate an on-line transaction according to one embodiment.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

Embodiments of the present disclosure enable a consumer to place funds in escrow with an on-line payment provider, such as PayPal, Inc. of San Jose, Calif., while corresponding with a seller and deciding whether to purchase an item or service, with notification to the seller using a secret message shared between the seller and the payment provider. If the potential transaction is canceled, the funds are returned to the consumer's account. If the transaction is to be completed, the funds are released to the seller's account, where the consumer can authorize release through a mobile device and the seller can receive confirmation through a mobile device. The seller can then transfer the item to complete the transaction. By placing funds in escrow, a level of security is provided for both the buyer and seller. For the buyer, he can inspect the product or service, meet the seller, etc., before he sends the funds. For the seller, he is assured that the buyer has sufficient funds to complete the transaction. The added secret message provides an assurance to the seller that funds were actually transferred to the account.

FIG. 1 is a flowchart 100 showing one embodiment of using an escrow account to facilitate an on-line financial transaction. In step 101, a seller lists an item for sale on an on-line site, such as PayPal, craigslist, or Kijiji. Note that for conciseness, a product, good, or item can also include a service and is not limited to just a tangible item. In step 102, the seller defines a "secret" message, which the buying public does not know. The secret message can be shared with an on-line payment provider who will be managing a subsequent transfer of funds in escrow and for a final purchase, as will be discussed in detail. The secret message can be any seller-defined message, such as a word, a phrase or sentence, a sequence of letters, characters and/or numbers, a recorded message or sound (of the seller's voice or from a set of sound samples), or a picture (a personal picture or from a set of picture samples). The secret message does not have to be unique to a particular item, and may be used repeatedly with any listing by the seller. The seller may have the option of creating a new secret with each new listing or simply selecting a previously used or created secret. The payment provider may be received from another on-line site, such as a simply a listing site, and does not need to be directly received from the seller.

In step 103, the consumer or buyer locates a product or service that the consumer may be interested in purchasing. In one example, the consumer may search the Internet for a particular item or browse a site to see if there is anything of interest. In the former situation, the consumer may be presented with numerous sellers, which the consumer can narrow down to a few selected sellers for follow up. In the latter situation, the consumer may access a classified ads site such as craigslist or Kijiji, which have basic listings of goods and services organized in different categories.

Once an item is located, the consumer decides whether additional information is needed for a purchasing decision, in step 104. The additional information could be an actual inspection of the product, meeting the seller, additional photos/description, references, specific details of the product, etc. If not, which may be the case where the product is a known product advertised from an established retailer, the consumer can simply complete the purchase or transaction at step 106. This may be accomplished through any known means, such as simply entering payment information or funding source (e.g., credit card information) and authorizing the purchase on the site of the on-line merchant.

However, if, as determined in step 104, the consumer requires additional information before making a purchasing decision, the consumer first contacts the seller in step 108. The consumer may contact the seller by any suitable means, including online, e-mail, texting, phone call, facsimile, etc., and convey that the consumer is interested in the product or service, but would require more information than what is currently provided. Once the seller agrees to provide or make accessible this additional information, the consumer can place all or a portion of the funds for the transaction in a holding account or escrow. This can be through a third party, such as PayPal or other on-line payment provider. Accordingly, at step 110, the consumer accesses an on-line payment provider service. This can be through a consumer device, such as a desk top computer, a laptop computer, a mobile phone, a PDA, or other computing device, through wired or wireless communication networks. If the consumer does not have an account with this particular provider, the consumer can easily create an account by entering requested information, such as e-mail, user name, and/or a password. If the consumer already has an account, the consumer accesses the account by logging into the account, such as simply entering in an e-mail address or user name and a password.

When the account is accessed, the consumer deposits funds into an escrow or holding account associated with the consumer's on-line account in step 112. The consumer can enter the amount of money to be put into the escrow account, along with the funding source of the money. For example, the consumer may simply enter a specific amount from a touchpad or keyboard of the consumer device, or the consumer may select from a series of buttons having different set amounts (e.g., $10, $20, $30, etc.). In naming a funding source, the source may be an account with the payment provider or an outside financial institution, such as a bank or credit card. The funding source can be specified by entering an account number, such as a credit card number or bank account number, or selecting from one or more pre-set sources, which may already have all the needed relevant information. In that case, a simple press of a button may be sufficient to select the funding source.

In addition to specifying an amount and funding source, the consumer may also designate a recipient of the funds if they are released, although not required at this stage. This information may include an account number, account name, a device phone number, email, or any other suitable information. The recipient or seller does not need to have an account with the payment provider; however, in that case, the payment provider should have the capability of receiving or sending funds to another financial institution, such as a bank. If the payment provider has contact information about the seller, the payment provider may notify the seller that funds have been placed in escrow for the seller, where such notification may include transmission of the seller's secret defined in step 102. The consumer may also be notified that funds have been transferred and placed in escrow, but the secret would not be communicated to the consumer. Notification can be by e-mail, SMS, or any other suitable form of communication. Depending on the form of notification, the notification can be received on a mobile phone, PDA, or computer.

Once funds have been deposited into escrow, the consumer may contact the seller, in step 114, for additional information about the product or service. Note that this step may be performed prior to depositing funds in escrow, or certain actions in step 112, such as designating a recipient, may be performed communication with the seller. The communication can be any suitable purpose, including obtaining additional information about the product or seller. For example, the consumer may want photos or additional photos of the product, a more detailed description of the product, references for the seller, or information about the seller, such as location, number of sales, etc. The consumer may also want to contact the seller to negotiate price or propose a partial trade. All of this can be accomplished through any agreed upon means between the consumer and seller. Examples include an in-person meeting and/or information sent via e-mail, facsimile, or mail. The information exchange can occur over several meetings or correspondences.

At some point, the consumer decides whether to proceed with the transaction, i.e., make a purchase from the seller, at step 116. There could be any number of reasons for not moving forward with the transaction, such as reliability of the seller, quality of the item, price of the item, or even source of the item. Another reason for not proceeding with the purchase may be that simply the seller decided not to sell the item or to this particular consumer. Regardless the reason, if, as determined at step 116, the item will not be purchased, the consumer notifies the payment provider, such as through a mobile device or computer, to return the funds held in the escrow account back to the consumer's funding source. For example, the consumer may simply press a cancel button on a mobile device, call the payment provider, send an e-mail, or any other suitable communication means. Upon receipt and processing of the consumer communication, the payment provider returns the held funds back to the consumer, in step 118. In one embodiment, funds are returned back to the consumer if no instructions are received within a set period of time, such as 3 months from time of deposit. The funds can be returned to the same account that funded the original transfer into escrow or to a different account specified by the consumer. Thus, even though the transaction was not completed, the consumer and seller were able to move forward with more information than just the initial listing for a more informed decision. Furthermore, the consumer easily and quickly gets his "good faith" money back.

If, however, in step 116, the consumer decides to purchase the item, the consumer then determines, in step 120, if the funds deposited in escrow are sufficient to complete the purchase. If not, additional funds are deposited in step 122. The additional funds can be deposited into the same escrow account or to another designated account, such as the seller's account. The seller's account may be with the same payment provider or with a different entity. In one embodiment, the additional funds are deposited by entering in the additional amount and selecting a destination account, such as by selecting from a group of pre-selected accounts or entering in a specific account number or other account information.

Next, at step 124, the consumer can release the funds to the seller. Note that in some embodiments, the release of funds can be done at any time desired by the consumer, such as during communications with the seller or prior to transferring additional funds in step 122. Releasing the funds can be accomplished via any suitable wireless communication, such as, but not limited to short message service (SMS) text messaging and near field communication (NFC) with the consumer's mobile device. The consumer can simply type in a one word message, such as "OK", and transmit that message to the financial service provider. The consumer, in other examples, may also type in the amount being released (such as when not all funds are desired to be released at that time), an authorization code, a personal identification number (PIN), etc. Once the payment provider receives the consumer authorization/information, funds are sent to the seller's account.

At that time, the payment provider may send, such as through SMS, a confirmation to the seller's mobile device that the requested funds have been released and deposited into the seller's account, at step 126. The payment provider may also send the same or similar confirmation to the consumer's mobile device. Note that the either confirmation can be sent in any manner to any device and is not limited to mobile devices of the consumer or seller. Included in the confirmation to the seller is the seller's secret message, defined in step 102 above. For example, the confirmation may include the text of the secret message, an audio playback of the secret voice or sound recording, an image of the secret picture, etc. Since the buying public does not have access to the shared secret, a fraudulent message with the secret will be extremely hard, if not impossible, to send. As a result, if the seller receives the secret with the confirmation or notification, the seller can be confident that funds actually have been transferred to the account.

The seller, upon receiving this confirmation, may then complete the transaction in step 128. This step may include giving the product to the consumer, such as in person, through the mail, through a download, a voucher, etc. As part of completing the transaction, the consumer and seller may set up the transaction online or in person at any stage prior to actual exchange of the product, such as at step 114. For example, details of how the product will be given to the consumer may be agreed upon, such as mailing address, meeting location, etc., as well as any shipping or handling charges or special requests. This may make it easier for both parties to complete the transaction, since these steps would then not need to be addressed during a meeting or event for the additional information or for the actual product exchange.

Figure 2:
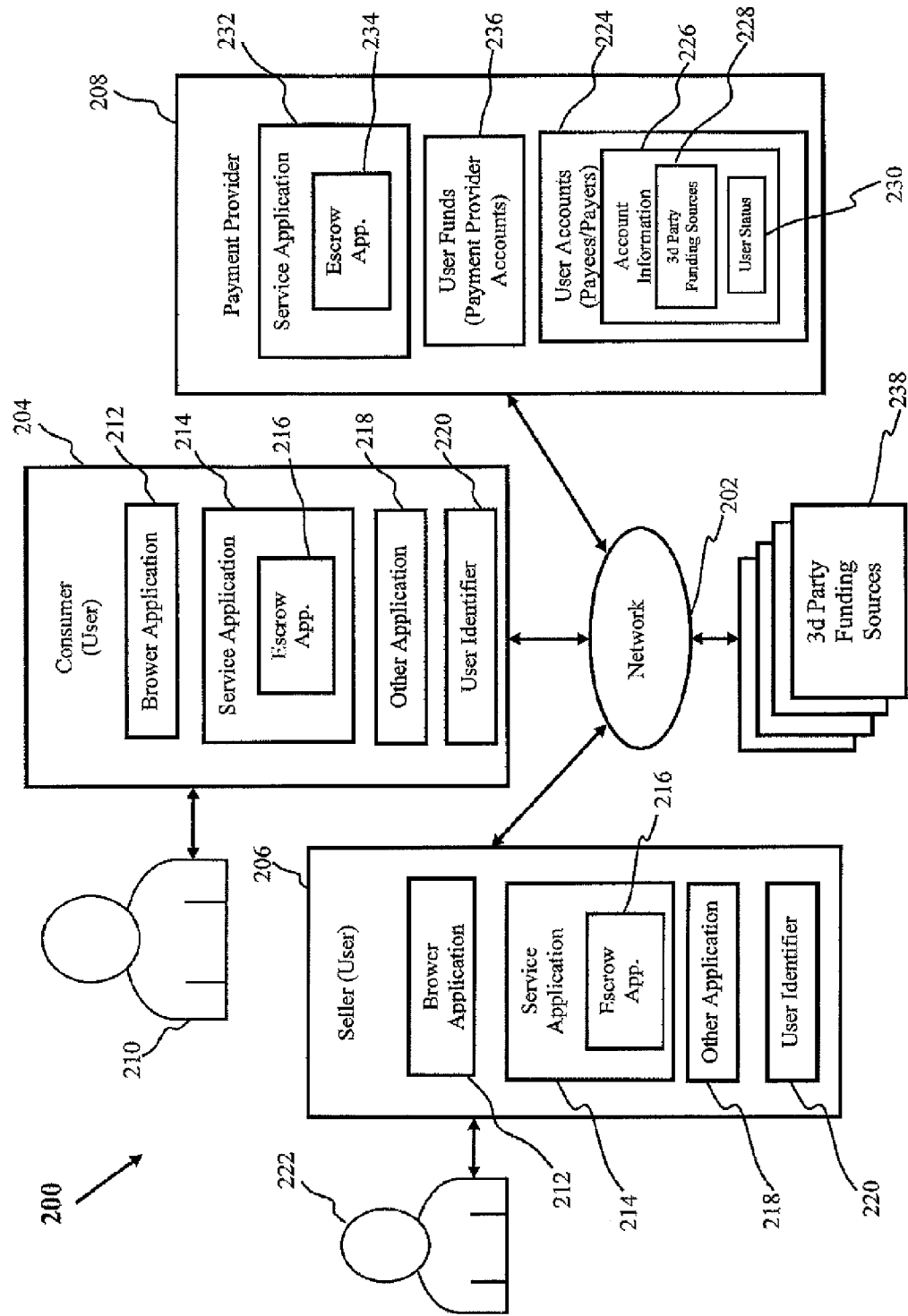
FIG. 2 is a block diagram of a system used for facilitating an on-line account according to one embodiment.

FIG. 2 shows one embodiment of a block diagram of a system 200 configured to facilitate financial transactions over a network 202 to perform the steps described above with respect to FIG. 1. As shown in FIG. 2, system 200 includes at least one consumer device 204, one seller device 206, and at least one payment provider server 208 in communication over network 202. In one embodiment, network 202 may be implemented as a single network or a combination of multiple networks. For example, network 202 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

In one embodiment, consumer device 204 may be implemented using any appropriate combination of hardware and/or software configured for wired and/or wireless communication over network 202. For example, consumer device 204 may be implemented as a personal computer of a consumer/user 210 in communication with network 202, a wireless telephone (e.g., cell phone), personal digital assistant (PDA), notebook computer, and/or various other generally known types of computing devices. Consumer device 204 may include one or more browser applications 212 which may be used, for example, to provide a user interface to permit the consumer 210 to browse information available over network 202. For example, browser application 212 may be implemented as a web browser to view information available over the Internet.

Consumer device 204 may also include a service application 214 for facilitating financial transactions on network 202. The service application may include an escrow application 216 which may support or facilitate depositing funds into an escrow or holding account. In an example embodiment, the service application 214 comprises a software program or programs, such as a graphical user interface (GUI), executable by a processor that is configured to interface and communicate with a seller 222 via network 202 and seller device 206 and with payment provider server 208 via network 202. In an example embodiment, the service application may be resident on the consumer device or accessed by a consumer through network 202. Consumer 210 may initiate an escrow transaction with seller 222 through the devices. The seller may respond to the consumer, and the payment provider server may facilitate the transaction, record the transaction, and execute the transaction as appropriate.

In an example embodiment, service application 214 and escrow application 216 may be accessed using a protocol such as a WSDL (web services definitional language), SOAP (simple object access protocol), API (application program interface), or the like. The applications may be initiated from a remote call procedure from an API or other protocol. The remote calls may be initiated from a program resident on the consumer's device, for example, a financial software program such as QUICKEN, QUICKBOOKS, INTUIT, SAP or from a third-party platform or website, for example a social networking site such as FACEBOOK, MYSPACE or any other website that may feature access to a payment provider service application or escrow application When installed on or accessed by consumer device 204 and run from consumer device 204, service application 214 is configured to provide and display payment services mechanism or mechanisms, such as an image, icon, radio button, dialogue box or other graphical user interface (GUI) on a display component (e.g., monitor) of consumer device 204. In general, the GUI represents a program, application, command, link to a web page, etc., wherein consumer 210 may select a payment service, shop, conduct other payment processing services. The GUI may include a the option of initiating an escrow transaction by taking a certain action, for example by clicking on a related icon, radio button, link or other button or representation using a cursor control component (e.g., mouse) or keyboard.

In an example embodiment, in which consumer 210 has not yet established an account or user record with payment provider server 208, upon installation of service application 214, consumer 210 may be prompted to establish a user account with payment provider server 208, wherein consumer 210 may use consumer device 204 to access payment provider server 208 via network 202. When establishing a user account, consumer 210 may be asked to provide personal information, such as name, address, phone number, user name, e-mail address, password, etc., and financial information, such as banking information, credit card information, etc.

Payment provider server 208 may create a user account 224 for each user or consumer 210. The user account may include account information 226, including third party funding source information 228 used to fund the escrow account, and a user status 230. Third-party funding source information 228 may include the identity of sources, routing numbers, account numbers and the like. Information related to the availability of funds and/or credit may be stored as part of a user status.

Consumer device 204 may include other applications 218 as may be desired in particular embodiments to provide additional features available to consumer 210. For example, such other applications 218 may include security applications for implementing consumer-side security features, programmatic user applications for interfacing with an appropriate protocol such as WSDL, SOAP or API or the like over network 202 or various other types of generally known programs and/or applications.

Consumer device 204 may also include one or more user identifiers 220, which may be implemented, for example, as operating system registry entries, cookies associated with browser application 212, identifiers associated with hardware of the consumer device 204, or various other appropriate identifiers. User identifier 220 may include attributes related to the user, such as personal information (e.g., a user name, password, photograph image, biometric ID, address, phone number, etc.) and banking information (e.g., banking institution, credit card issuer, user account numbers, security information, etc.). In various implementations, user identifier 220 may be passed with a request to transfer funds into an escrow account to payment provider server 208, and user identifier 220 may be used by payment provider server 208 to associate consumer 210 with a particular user account 224 maintained by payment provider server 208.

In one embodiment, seller device 206 may be similar to consumer device 204. It may be owned, operated and maintained, for example, by a financial or payment services provider with user account 224 stored on payment provider server 208. Seller device 206, browser application 212, service application 214, escrow application 216, other applications 218, and user identifier 220 may implemented similarly as described above with respect to the consumer device. Service application 214 of seller device 206 may also enable the seller to post a listing of an item for sale on an on-line site through network 202. Service application 214 may also enable the seller to communicate with payment provider 208 via network 202 to define or create the shared secret, as discussed above with respect to FIG. 1.

Payment provider server 208 may be maintained, for example, by an online payment service provider, such as PayPal, Inc. of San Jose, Calif., which may provide payment processing for online transactions on behalf of consumer 210 to seller 222 through their respective devices 204 and 206. In this regard, payment provider server 208 includes one or more service applications 232, which may be configured to interact with the devices 204, 206 over network 202 to facilitate the financial transactions (including escrow transactions), purchase of items, products and/or services from other users or from third-party merchants (not shown).

Payment provider server 208 may be configured to maintain a plurality of user (buyers and sellers) accounts 224, each of which may include account information 226 associated with individual users, including consumer 210 and seller 222 associated with the devices 204, 206, respectively. For example, account information 226 may include information, such as one or more account numbers, passwords, credit card information, banking information, user name, or other types of financial information, which may be used to facilitate online transactions between consumer 210 and seller 222. User accounts 224 may include memory in individual seller accounts that stores the shared secret from the seller.

User funds accounts 236 may be maintained by payment provider server 208, which represent funds that are held by the payment provider. The funds in the account may represent funds received in previous transactions and/or funds placed in the account by a user for access through the payment provider services and/or funds returned to a user by a merchant upon a return of an item or cancellation of a service. Funds deposited and held in escrow accounts may also be maintained in user funds accounts, where funds are not released from the escrow accounts until instructed by an authorized user.

Thus, in one embodiment, consumer 210 communicates to payment provider server 208 from consumer device 204 via network 202, instructing a transfer of funds to an escrow account held in user funds 236 of payment provider server 208. Funds can be transferred from accounts maintained by payment provider server 208 or from third party funding sources 238, such as linked bank accounts or credit cards. If a transaction or purchase is completed or to be completed, consumer 210, through the same means, may instruct payment provider server 208 to release or transfer the held funds to an account of seller 222, maintained in payment provider server 208 or outside. Otherwise, the held funds are returned to consumer 210.

Figure 3:
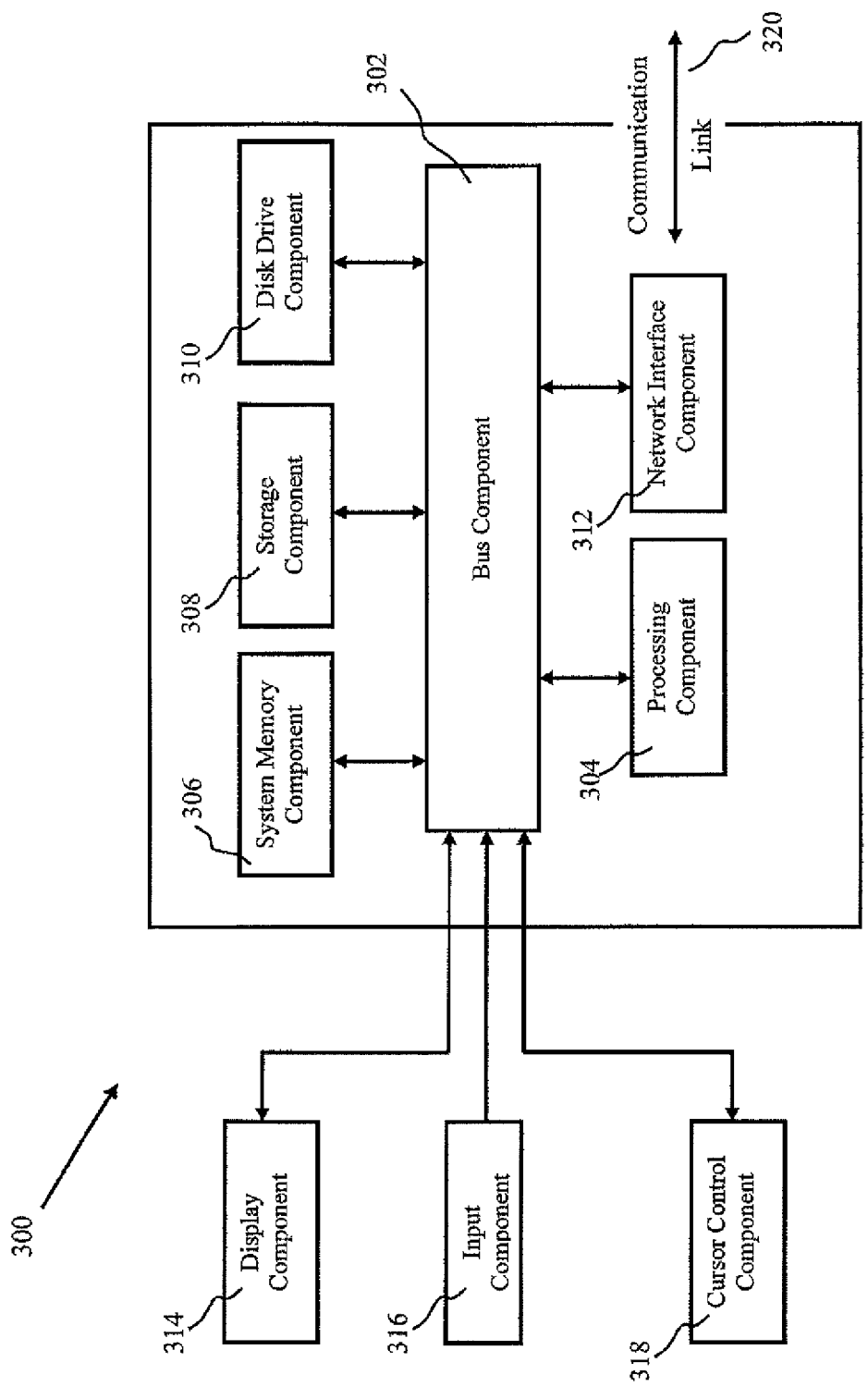
FIG. 3 is a block diagram of one embodiment of a system that can be used to implement one or more components of the system in FIG. 2.

FIG. 3 is a block diagram of a computer system 300 according to one embodiment, which may be suitable for implementing embodiments of various aspects of this disclosure, including, for example, device 204, device 206 and/or payment provider server 208. In various implementations of various embodiments, device 204 and/or device 206 may comprise a personal computing device, such as a personal computer, laptop, PDA, cellular phone or other personal computing or communications devices. Payment provider server 208 may comprise a network computing device, such as one or more servers, computer or processor combined to provide the payment services. Thus, it should be appreciated that devices 204, 206, and/or payment provider server 208 may be implemented as computer system 300 in a manner as follows.

In one embodiment, computer system 300 may include a bus 302 or other communication mechanism for communicating information, which interconnects subsystems and components, such as a processing component 304 (e.g., processor, micro-controller, digital signal processor (DSP), etc.), a system memory component 306 (e.g., RAM), a static storage component 308 (e.g., ROM), a disk drive component 310 (e.g., magnetic or optical), a network interface component 312 (e.g., modem or Ethernet card), a display component 314 (e.g., CRT or LCD), an input component 316 (e.g., keyboard or keypad), and/or a cursor control component 318 (e.g., mouse or trackball). In one embodiment, disk drive component 310 may comprise a database having one or more disk drive components.

Computer system 300 may perform specific operations by processor 304 executing one or more sequences of one or more instructions contained in system memory component 306, according to steps described above with respect to FIGS. 1 and 2. Such instructions may be read into system memory component 306 from another computer readable medium, such as static storage component 308 or disk drive component 310. The various storage or memory components may be used to store the seller's shared secret. In other embodiments, hard-wired circuitry may be used in place of or in combination with software instructions to implement the invention.

Logic may be encoded in a computer readable medium, which may refer to any medium that participates in providing instructions to processor 304 for execution. Such a medium may take many forms, including but not limited to, non-volatile media, volatile media, and transmission media. In various implementations, non-volatile media includes optical or magnetic disks, such as disk drive component 310, volatile media includes dynamic memory, such as system memory component 306, and transmission media includes coaxial cables, copper wire, and fiber optics, including wires that comprise bus 302. In one example, transmission media may take the form of acoustic or light waves, such as those generated during radio wave and infrared data communications.

Some common forms of computer readable media includes, for example, floppy disk, flexible disk, hard disk; magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various example embodiments, execution of instruction sequences for practicing embodiments of the invention may be performed by computer system 300. In various other embodiments, a plurality of computer systems 300 coupled by communication link 320 (e.g., network 110 of FIG. 1, LAN, WLAN, PTSN, or various other wired or wireless networks) may perform instruction sequences to practice the invention in coordination with one another.

Computer system 300 may transmit and receive messages, data, information and instructions, including one or more programs (i.e., application code) through communication link 320 and communication interface 312. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Having thus described embodiments of the invention, persons of ordinary skill in the art will recognize that changes may be made in form and detail without departing from the scope of the invention. Thus, the invention is limited only by the claims.

What is claimed is:

1. A system for facilitating an on-line transaction, comprising:
 a non-transitory storage device storing information about user accounts with an on-line site, wherein the information comprises a plurality of secrets defined by a plurality of sellers and unknown to a plurality of buyers; and
 a processor executing instructions to perform:
  receiving a secret from a seller, wherein the secret is defined by the seller and unknown to a buyer;
  receiving a request from the buyer to transfer funds to a holding account, wherein the funds are at least a partial payment for on-line goods or services;
  transferring the funds to the holding account;

receiving a request from the buyer to release the funds to an account of the seller;

transferring the funds from the holding account to the account of the seller; and transmitting a confirmation comprising the secret to the seller when the funds are transferred to the account of the seller.

2. The system of claim 1, wherein the processor executes instructions to further perform transferring the funds in the holding account back to the buyer if the on-line transaction is not completed.

3. The system of claim 1, wherein the processor executes instructions to further perform notifying the buyer when the funds are transferred to the holding account or to the account of the seller.

4. The system of claim 1, wherein the secret is an audio or text message, a sequence of symbols, or a picture.

5. The system of claim 1, wherein the secret is created by the seller.

6. The system of claim 1, wherein the secret is selected by the seller from a set of secrets.

7. The system of claim 1, wherein the secret is unique to each seller.

8. The system of claim 1, wherein the secret is unique to each good or service.

9. The system of claim 1, wherein the processor executes instructions to further perform receiving, from the buyer, a request to transfer funds from one or more additional accounts of the buyer to the account of the seller if the funds in the holding account are insufficient to fully pay for the on-line goods or services.

10. A system for facilitating an on-line transaction, comprising:

a non-transitory storage device storing a plurality of secrets defined by a plurality of sellers using an on-line site, wherein the secrets are unknown to a plurality of buyers; and a processor executing instructions to perform:

receiving, from a seller, a listing for sale a good or service on the on-line site;

receiving, from the seller, a secret associated with the listing and unknown to a buyer;

transmitting, by the on-line site to a payment provider, the secret when funds from an escrow account of the payment provider have been transferred to a seller's account, wherein the payment provider then provides a notification comprising the secret to the seller after the funds are transferred to the seller's account; and providing the good or service to the buyer after receiving a notification from the payment provider.

11. The system of claim 10, wherein the escrow account and the seller's account are maintained by the payment provider.

12. The method of claim 10, wherein the secret is an audio or text message, a sequence of symbols, or a picture.

13. The method of claim 10, wherein the secret is unique to each seller.

14. The method of claim 10, wherein the secret is unique to each good or service.

15. A non-transitory computer-readable medium containing instructions that cause a service provider facilitating financial transactions over a network to perform a method comprising:

receiving, by the service provider, a secret from a seller, wherein the secret is defined by the seller and unknown to a buyer;

receiving a request from the buyer to transfer funds to a holding account, wherein the funds are at least a partial payment for on-line goods or services;

transferring the funds to the holding account;

receiving a request from the buyer to release the funds to an account of the seller;

transferring the funds from the holding account to the account of the seller; and transmitting a confirmation comprising the secret to the seller when the funds are transferred to the account of the seller.

16. The non-transitory computer-readable medium of claim 15, wherein the secret is an audio or text message, a sequence of symbols, or a picture.

17. The non-transitory computer-readable medium of claim 15, wherein the secret is created by the seller.

18. The non-transitory computer-readable medium of claim 15, wherein the secret is selected by the seller from a set of secrets.

19. The non-transitory computer-readable medium of claim 15, wherein the secret is unique to each seller.

20. The non-transitory computer-readable medium of claim 15, wherein the secret is unique to each good or service.

21. The non-transitory computer-readable medium of claim 15, wherein the method further comprises receiving, from the buyer, a request to transfer funds from one or more additional accounts of the buyer to the account of the seller if the funds in the holding account are insufficient to fully pay for the on-line goods or services.

\* \* \* \* \*